United States Patent [19]

Baker et al.

[11] Patent Number: 5,069,292
[45] Date of Patent: Dec. 3, 1991

[54] METHOD FOR SOIL CLOD/ROOT CROP SEPARATION

[76] Inventors: Henry A. Baker; Nathan L. Baker, both of Rte. 2, Burley, Id. 83318

[21] Appl. No.: 585,977

[22] Filed: Sep. 21, 1990

[51] Int. Cl.$^5$ ........................ A01D 17/10; B65G 15/14
[52] U.S. Cl. ........................................ 171/1; 171/130; 171/126; 198/626.3
[58] Field of Search ................ 171/130, 126, 127, 128, 171/122, 123, 124; 209/247; 198/626.3, 415, 623, 626.2, 626.4

[56] References Cited

U.S. PATENT DOCUMENTS

| 1,917,659 | 7/1933 | Marshall | 198/626.4 |
| 2,257,351 | 9/1941 | Silver . | |
| 3,340,935 | 9/1967 | Csimma | 171/130 |
| 4,155,440 | 5/1979 | Bogdanski et al. | 198/415 |
| 4,195,724 | 4/1980 | Janitsch . | |
| 4,382,471 | 5/1983 | Peterson | 171/124 |
| 4,411,778 | 10/1983 | Venable . | |
| 4,464,884 | 8/1984 | Franks | 198/415 |
| 4,471,876 | 9/1984 | Stevenson, Jr. et al. . | |
| 4,585,118 | 4/1986 | Plaut | 196/626.2 |
| 4,798,248 | 1/1989 | Schwitters | 171/1 |
| 4,842,076 | 6/1989 | Welp | 171/130 |

FOREIGN PATENT DOCUMENTS 525260 1/1954 Belgium ........................ 171/130
2017536 10/1979 United Kingdom .

Primary Examiner—Dennis L. Taylor
Assistant Examiner—Spencer Warnick
Attorney, Agent, or Firm—King & Schickli

[57] ABSTRACT

A method and related apparatus is provided for size reduction and separation of soil clods mixed with a root crop. The method includes the steps of feeding the mixture along an enclosed operative path, manipulating the mixture so as to change the shape of the conveyed mass and break up the soil clods sufficiently to reduce the size and separating the clods from the crop. The manipulation preferably takes the form of shifting the clods longitudinally and laterally with respect to each other. The operative path is preferably serpentine in shape with the clods/crop expanding along the outside of bends and contracting along the inside of bends. The serpentine path is oriented in a substantially vertical direction and may provide differential speeds along the boundaries of the path. The optimum mixture is approximately 50% soil clods at the entry end, with the range being between 35% and 65%. The preferred apparatus includes a pair of endless conveyor belts guided by horizontally extending rollers and retaining panels positioned in juxtaposition with the edges of the conveyors along the operative runs. Spring loaded idler rollers maintain the conveyors taut and an endless chain conveyor downstream of the exit end of the serpentine path separates the reduced clods from the root crop.

10 Claims, 2 Drawing Sheets

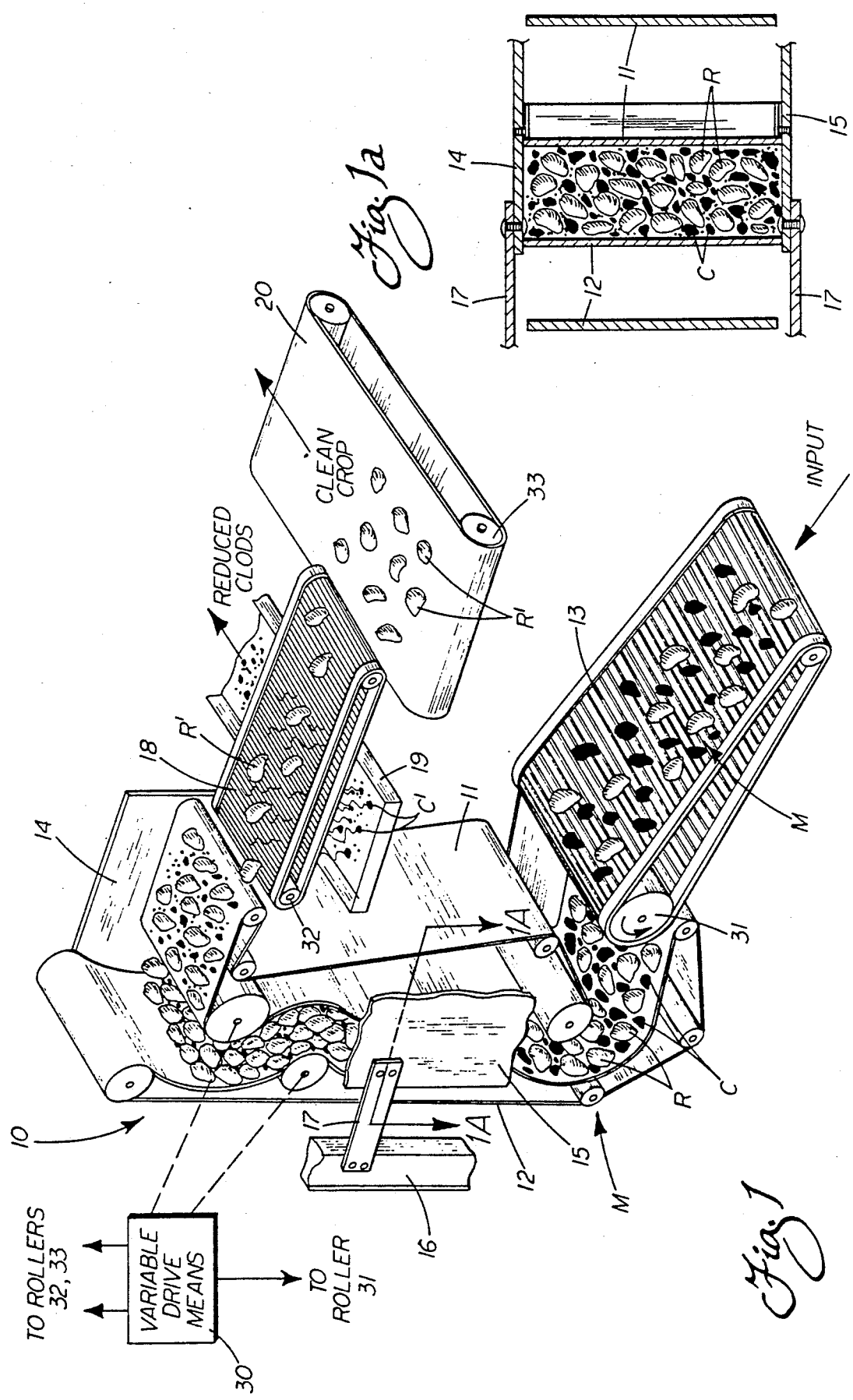

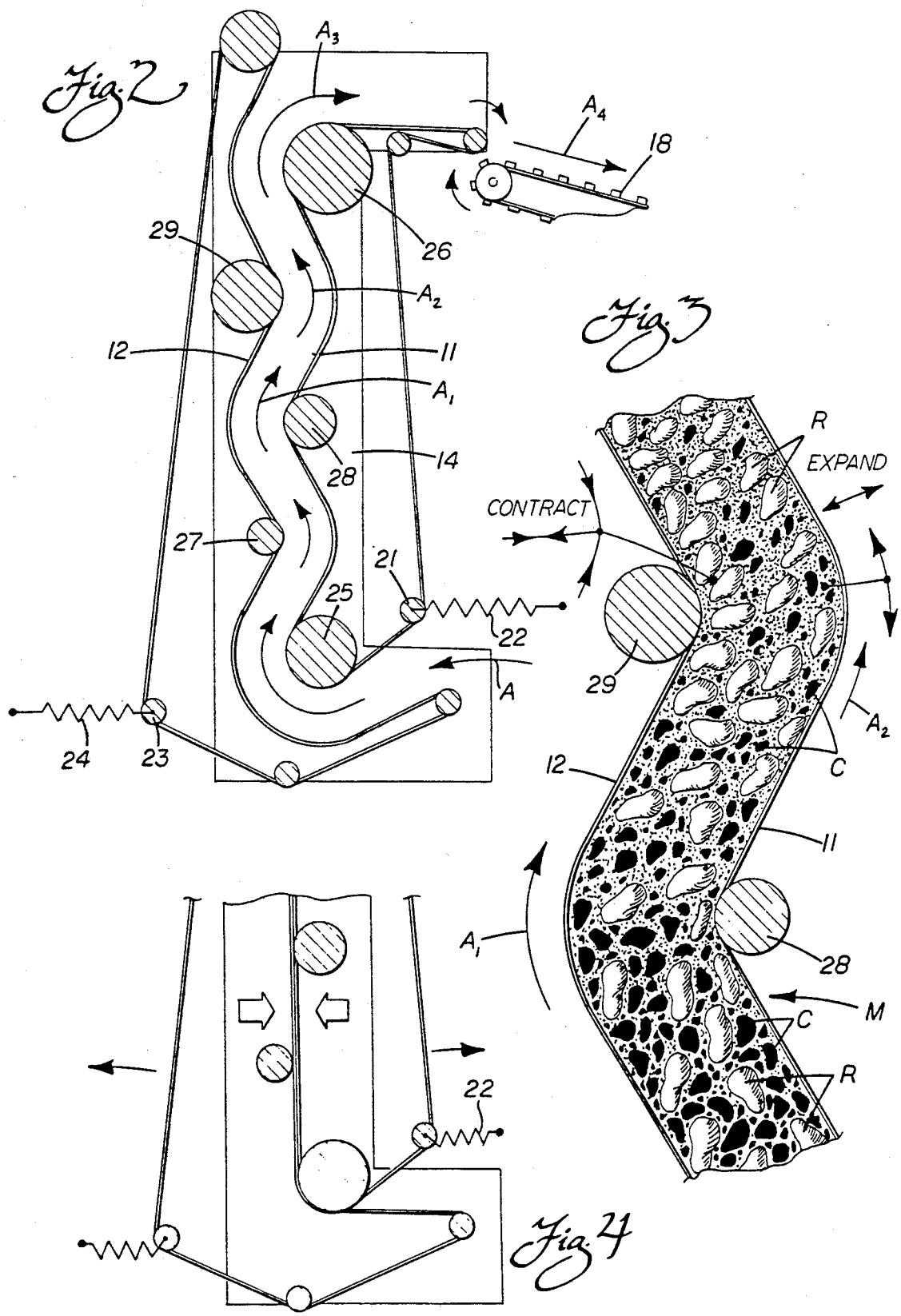

METHOD FOR SOIL CLOD/ROOT CROP SEPARATION

TECHNICAL FIELD

The present invention relates to harvesting methods and equipment, and more particularly, to size reduction and separation of soil clods from a root crop, such as potatoes, onions, turnips and the like.

BACKGROUND OF THE INVENTION

The current state of the art of harvesting methods for root crops do not adequately provide for the removal of clods of soil from the crop while at the same time protecting the quality of the crop. Indeed, in order to provide an adequately cleaned root crop, hand labor is presently being used to remove the clods at some point downstream of the harvesting equipment.

There have been several attempts at providing equipment to mechanically reduce the size of the soil clods so that the clods can be removed. One prior method involves simply passing the mixture over a slotted or linked conveyor chain; the smaller soil clods falling through the chain while the root crop, such as potatoes, being retained on top of the conveyor chain. In practice, this approach has proved not to be effective, and has led to such improvement attempts as jiggling the conveyor chain to try to break up the clods, passing the clod/root crop mixture over rubber rollers with eccentric elements or paddles and/or tumbling of the clods/crop mixture in other various mechanical devices. It has been found that these methods not only do not break up the soil clods sufficiently to allow their separation, but also can severely damage the root crop by bruising.

It is a generally accepted fact that handling root crops along with relatively large amounts of soil tends to protect the root crop from bruising. In effect, the soil provides a cushion for the potatoes or the like during the harvesting and subsequent handling processes. We have discovered that soil clods when mixed with the potatoes can be effectively broken into reduced size with less pressure than is required to bruise the potatoes. With this discovery, we have conceived the method and apparatus to handle the root crop, such as potatoes with relatively large amounts of soil in such a way as to not only reduce and eliminate clods but also protect the root crop. A desirable end result is that separation of the reduced size clods can be easily effected downstream, either immediately or in a later handling step.

As a result of our discovery and inventive approach, several advantages can be realized. Generally, higher conveyor speeds, and thus increased harvester speeds are possible because the root crop is protected against bruising by the cushioning of the soil clods. As a result, greater quantities can be harvested by the farmer and handled in a continuous fashion from the point of digging to storing of the crop. The need for hand labor can be substantially eliminated. The farmer can potentially receive a better return on his crop investment, due to not only the time saving in harvesting, but due to the higher quality product produced.

SUMMARY OF THE INVENTION

Thus, it is an objective of the present invention to provide a method and apparatus for reducing the size and separating soil clods from a root crop, such as potatoes, onions, turnips and the like, and eliminating the problems of the prior art.

It is still another object of the present invention to provide a method and apparatus that allows handling of the root crop in a mixture with soil and then easily reducing and separating the clods of soil so as to improve the quality of the crop.

It is still another object of the present invention to provide the improved method/apparatus for separation wherein the crop is cushioned and thereby protected from bruising, and at the same time the clods are being reduced and removed.

It is a further object of the present invention to provide an approach to reduction and separation of clods of soil including manipulation in a controlled fashion a mixture of clods/root crop along a serpentine path in a generally vertical direction.

It is still a further object of the present invention to provide an improved method/apparatus for reducing clods of soil in a mixture of soil and root crop by manipulation of the conveyed mixture of mass by relative shifting along an enclosed operative path.

To achieve the foregoing and other objects and in accordance with the purposes of the present invention as described herein, the improved method for reducing the size of the clods of soil and separating the reduced clods from the root crop includes feeding the mixture of clods/crop along an operative path, manipulating the mixture to shift and break up the soil clods so as to reduce the size and separate the reduced size clods from the crop. In practicing this method, the crop is advantageously cushioned by the soil and thus protected from bruising at the same time that the size of the soil clods is being reduced and removed.

In order to most efficiently carry out the method, the invention contemplates shifting of the soil clods/crop longitudinally and laterally with respect to each other along the operative path. This dual shifting action provides for unique expansion and contraction of the mixture serving in a manner to efficiently, but safely break up the clods. Preferably, the operative path along which the method is carried out is in a serpentine shape. As the mixture goes around each bend, the expansion takes place along the outside area in the bend whereas the contraction takes place along the inside area of the bend. Also, in a related efficiency enhancing approach, the operative path is positioned in a substantially vertical direction. The weight of the mixture serves to increase the compaction, especially at the bottom of the path so as to help crush the clods during the operation.

The related apparatus that is preferred for carrying out the improved method, comprises a pair of spaced, endless conveyor belts with operative runs facing each other and between which the mixture is positioned. Retaining means are positioned along the sides of the path to confine the mixture by cooperation with the edges of the belts. An inlet end of the path is defined at the bottom of the path and separating means is provided at the outlet end for removing the clods that have been reduced.

The serpentine path is provided by staggered guide rollers that are stacked generally vertically and spaced from each other depending on the extent of relative shifting desired. Parallel panels along the edges of the conveyor belts form the retaining means along the sides. At least one idler roller for each conveyor belt includes a spring mounting means to maintain the conveyor belts taut. While the preferred embodiment envisions conventional industrial strength belting to form the conveyor belts, other suitable alternatives, such as wire mesh belting could be used as long as the surface is relatively smooth.

A drive means is provided for at least one roller for each conveyor belt. It is proposed as another advantage to vary the speed of the belts so as to enhance the expanding/contracting action for additional shifting and crushing action of the clods. In traveling along the serpentine path, the mixture is controlled and held together at all times to protect the root crop from bruising or other damage. Separation is carried out downstream of the operative path by passing the reduced size clods/root crop over a cross link chain conveyor or the like having spaces sufficient to allow the passage of the clods, but not the crop.

It is contemplated that the preferred mixture of soil and soil clods to root crop is substantially 50%. However, the method and apparatus operates with other percentages, but with the preferred range as presently contemplated being 35%–65% soil clods. As the mixture of clods/crop moves up along the serpentine path, the cross section volume is maintained substantially constant. There is no retro movement or tumbling action of the crop, but instead it is held reasonably firm along the entire operative path. Thus, there is no bruising of the crop and the quality is enhanced. Even as the mixture expands along the outside of a bend opposite one of the guide rollers and contracts along the inside area of the bend, the basic volume remains unchanged.

At least one idler roller of each conveyor belt is spring mounted in order to keep the belts taut along the operative run. The staggered rollers may vary in size to also provide variable expansion/contraction along the operative path. The belts are in juxtaposition when there is no mixture within the conveyor assembly. Preferably the path is filled during operation and the clods are progressively crushed and reduced in size from bottom to top. However, the conveyor assembly is self-priming and the belts progressively open to increase the size of the operative path as the mixture is fed in. Also, the method and apparatus can operate effectively with intermittent feed where the entire path is not filled continuously.

Still other objects of the present invention will become apparent to those skilled in this art from the following description wherein there is shown and described a preferred embodiment of this invention, simply by way of illustration of one of the modes best suited to carry out the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 1 is an overall perspective view of harvesting equipment incorporating the concepts of the present invention to reduce in size and separate soil clods from a mixture of root crop, such as potatoes;

FIG. 1a is a cross sectional view taken along lines 1a—1a through the central area of the conveyor assembly forming a portion of the present invention;

FIG. 2 is a schematic cross sectional view showing the operative path for feeding of the mixture to reduce the soil clods, and with the operative runs of the belts being shown separated consistent with the path being substantially full and for optimum operation;

FIG. 3 is an enlarged partial view showing the root crop (potatoes) and the soil clods being moved through two bends of the conveyor assembly with an illustration of the expansion/contraction action; and FIG. 4 is a side cross sectional view of the bottom portion of the conveyor assembly but with the operative runs of the conveyor belts in juxtaposition with no clods/crop in between.

Reference will now be made in detail to the present preferred embodiment of the invention, an example of which is illustrated in the accompanying drawing.

DETAILED DESCRIPTION OF THE INVENTION

With reference now made to FIG. 1 for a more detailed description of the method and apparatus, there is shown in combination a plurality of conveyors, including a central conveyor assembly 10 that forms a key portion of the present invention. The assembly includes first and second endless conveyor belts 11, 12 positioned facing each other. As shown, a mixture M including root crop R and soil clods C is positioned between the two belts for controlled manipulation to reduce the size of the soil clods, in a manner to be seen more in detail below. While the endless conveyor belts 11, 12 are shown as typical industrial grade fabric belting, it is to be understood that other suitable alternatives, such as belting of wire mesh or the like could be used. However, it is important to note that the belts should be relatively smooth to provide a boundary layer along the entire length of the mixture M so as not to bruise or puncture the root crop R.

The input end of the overall harvesting equipment (FIG. 1) is defined by a cross linked chain conveyor 13, which in turn receives the mixture M from a digging device (not shown). The input conveyor 13 feeds into the open mouth of the conveyor assembly 10 wherein the mixture M of the root crop R and the intermixed clods C of soil are trapped between the operative runs of the conveyor belts 11, 12. As illustrated, the operative path along which the mixture M passes within the conveyor assembly 10 is confined along the sides by retaining panels 14, 15 (see FIG. 1a also). These panels 14, 15 can be supported in a typical fashion, along with the rollers defining the operative path, by a suitable frame 16 and mounting arms 17 ( shown schematically and broken away in FIG. 1 for simplicity and clarity).

At the top of the conveyor assembly 10, the mixture M is carried along the upper operative run of the belt 11 and deposited on a second cross linked chain conveyor 18 that includes spaces sufficiently large to allow reduced clods C' to fall through, but not the root crop R. A typical inclined slide tray or the like is effective to remove the clods C' and return them to the field in which the harvester is moving, or to another location if separation is not effected immediately. The separated clean root crop R' is then deposited on a takeaway conveyor 20 for further processing, packaging and entry into the produce market.

The flow arrow A depicts the entry end of the conveyor assembly 10, intermediate flow arrows $A_1$, $A_2$ illustrating the mixture extending around a pair of bends along the path and flow arrow $A_3$ illustrating the flow of the mixture at the outlet end. Flow arrow $A_4$ illustrates the position at the cross linked separating conveyor 18. The operative flow path for manipulation of the mixture M is defined by the flow arrows A—$A_3$ (see FIG. 2).

An idler roller 21 is mounted by a spring 22 that is operative to maintain the conveyor 11 taut under all conditions. An idler roller 23 with a similar spring mounting 24 maintains the opposite conveyor 12 taut. Support rollers 25, 26 for the conveyor belt 11 define the inlet and outlet ends, respectively. Intermediate rollers 27, 28 and 29 are in between and vary in cross section from small to large going from bottom to top of the intermediate section. Each of the rollers 25–29 defines bends so as to form the path in a serpentine fashion. As the mixture M traverses the path, the clod reducing method or process of the present invention takes place.

At least one of the rollers supporting each of the conveyor belts 11, 12 is driven by a variable drive means 30 (see FIG. 1). In addition, a roller 31 for the inlet conveyor 13, as well as one of the rollers 32, 33 of the separation conveyor 18 and the takeaway conveyor 20, respectively, can be driven and controlled by the drive means 30, as schematically illustrated. Each of the rollers 25–29 is mounted for rotation in a stationary location, such as between the panels 14, 15. All except the drive rollers, such as rollers 26, 29, may be idlers. At any time that the mixture M is not positioned along the operative path, the springs 22, 24 retract and bring the operative runs of the belts 11, 12 into juxtaposition with each other, as shown in FIG. 4. Conversely, once a mixture M is introduced into the entry end, the belts are automatically separated forming the serpentine path (FIG. 2) and the soil clod reducing function can take place.

Thus, with primary focus now on FIG. 3 of the drawings, a more detailed look at the functional details of the method of soil clod reduction and separation of the present invention can be provided. This illustration schematically shows the feeding of the mixture M including the soil clods C and the root crop R, such as potatoes, at the two intermediate sections illustrated by flow arrows $A_1$, $A_2$ (compare to FIG. 2). The mixture M substantially fills the elongated operative path. Within the mixture M, the positions of the clods C and the root crop R are manipulated and shifted longitudinally and laterally in a controlled fashion along this path to effectively shift and break up the soil clods C sufficiently to reduce the size thereof. At the outlet end (flow arrow $A_3$, FIG. 2), the reduced clods C and the root crop R are fed to the separation conveyor 18 (flow arrow $A_4$), where the method or process is completed. During the transport of the root crop R through the path, the soil clods C provide a cushioning function thereby protecting the root crop from bruising or other damage.

As the mixture M moves along the operative path, the bends in the path provide a significant factor in the breakup and crushing of the clods. The different size of the support rollers 27, 28 and 29 helps to ensure that the maximum manipulation and shifting does occur. As the path moves around a narrow bend, as defined by the small diameter roller 27, the shifting action compresses to a maximum along the inside area next to the roller 27; whereas, with the larger roller 29, the inside area is compressed less. Comparable shifting action is transferred to the outside areas away from the rollers 27, 29. The variation in the size thus provides a more homogeneous manipulation and shifting so that by the time the mixture M is directed to the outlet end (arrow $A_3$), the clods C' are reduced sufficiently to be removed from the root crop R'.

As best shown in FIG. 3, the manipulation and dual shifting along the inside area and outside area around the bend defined by flow arrow $A_2$ (adjacent the roller 29) can be shown graphically. Around the inside area, the mixture M tends to be compressed or contracted longitudinally and laterally so that additional pressure is provided to break up and crush the clods C. Along the outside area, the root crop R and the clods C tend to expand and shift both longitudinally and laterally advantageously releasing the pressure. This release is important in positioning the remaining clods C in position to be further acted on at the next roller. For example, at the next bend represented by the flow arrow $A_3$ around the roller 26, the mixture M that has been expanded is compressed. With the clods C thus being shifted, they are in a better position for breaking up. In other words, along the area $A_3$, the mixture M is now the inside area around the bend, and the clods C that are shifted upstream are in a new, more favorable position for being broken up and reduced. By the time the entire path has been traversed, the clods are reduced to a size that allows them to be removed through the separating conveyor 18 without having to vibrate the cross links, or otherwise force the action. At the same time, no substantial voids in the mixture M are formed along the path, thus maintaining the cross sectional volume substantially equal at all points.

The preferred embodiment also defines the path along flow arrows A—$A_3$ oriented in substantially the vertical direction. The columnar weight provides increased compaction, especially along the lower end of the path. This provides increased crushing action of the clods C. However, it is to be understood that other positions and orientations of the path are within the broader aspects of the present invention.

As the mixture M traverses the several bends along the path, the mixture M along the inside area is decelerated since it is traveling a smaller distance, and conversely the mixture M along the outside of the bend is accelerated. Additionally, velocity changes in belt speeds can be introduced through the variable drive means 30; i.e. the differential speeds may be regulated to provide a continuing speed difference or intermittently. This further contributes to the desirable contraction/expansion that occurs. The longitudinal and lateral shifting action is enhanced, breaking up and crushing the clods in a very efficient manner.

As best shown in FIG. 3 and discussed above, it is actually a desirable attribute of the present invention to include soil clods C with the root crop R to cushion the root crop against bruising or other damage. While the percentage of soil clods may vary, especially with regard to the root crop being handled, it has been established that the percentage range of approximately between 35% and 65% soil clods works best. As a preferred embodiment, approximately 50% soil clods introduced at the entry end (flow arrow A) provides the best combination of cushioning action and soil clod breakup.

It is important that the boundary layers along the operative path are smooth and unobstructed. The serpentine structure of the conveyor assembly 10 lends itself well to this construction. The bends in the path tend to ensure against retro movement and tumbling which has been prevalent in some prior art arrangements. Thus, the controlled manipulation and shifting can be assured providing the best approach. There are no feeding lugs or other pushing devices on the conveyor belts 11, 12 and the restraining panels 15 are smooth and unobstructed.

In summary, the results and advantages of the soil clod C reduction and separation method/apparatus are now apparent. This important function of the harvesting arrangement can now be carried out for the first time at increased speed and with minimal risk of bruising of the root crop R. The dual function of breaking up and crushing the soil clods C to make removal easy, while at the same time protecting the root crop R from bruising is unique. The shifting of the soil clods/crop longitudinally and laterally results in alternate contraction and expansion along the operative path so that consistent action is attained in reducing the soil clods. Not only is the harvesting operation increased in speed, but the quality of the root crop is maintained.

The foregoing description of a preferred embodiment of the invention has been presented for purposes of illustration or description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

What is claimed is:

1. A method of reducing soil clods to soil mixed with a root crop after digging during harvesting, comprising the steps of:

feeding said mixture along an elongated operative path;

manipulating the mixture in a controlled fashion along an upward path to shift and break up the soil clods sufficiently to reduce the size thereof and form soil;

maintaining substantially smooth boundaries along all sides of the path during the manipulating step;

shifting of the crop within the mixture and without substantial separation during the manipulating step;

cushioning the crop with the soil clods and soil mixture during the manipulating step;

whereby the crop is cushioned by the clods and soil and protected from bruising at the same time the clods are being reduced.

2. The method of reducing soil clods of claim 1 including the step of shifting the mixture both longitudinally and laterally with respect to each other along said operative path.

3. The method of reducing soil clods of claim 2 including the step of forming the operative path in a serpentine fashion to provide the relative shifting of the mixture.

4. The method of reducing soil clods of claim 1 including the step of extending the operative path in substantially vertical direction to maintain and provide increased compaction to crush the clods.

5. The method of reducing soil clods of claim 1 including the step of establishing feed boundaries along the operative path; feeding the mixture adjacent the boundaries of the operative path at differential speeds to aid in manipulation of the mixture.

6. The method of reducing soil clods of claim 1 including the step of providing an entry end to said path, and establishing the mixture of clods/soil/crop at least approximately 50% soil clods at the entry end.

7. The method of reducing soil clods of claim 1 including the step of establishing the mixture at the entry end in the range of approximately between 35% and 65% soil clods.

8. The method of reducing soil clods of claim 3 including the steps of varying the compressing action along the serpentine path while maintaining the cross sectional unit volumes of the mixture substantially constant on the average along the operative path.

9. The method of reducing soil clods of claim 1 including in addition separating the reduced size clods generated during the manipulating step, from the crop.

10. The method of reducing soil clods of claim 9 including the step of retaining substantially all of the mixture together along the path, and said separating step being carried out after movement along said path.

* * * * *